Dec. 28, 1943.    HENRI-GEORGES DOLL    2,338,028
WELL SURVEYING INSTRUMENT
Filed Dec. 17, 1940    2 Sheets-Sheet 1
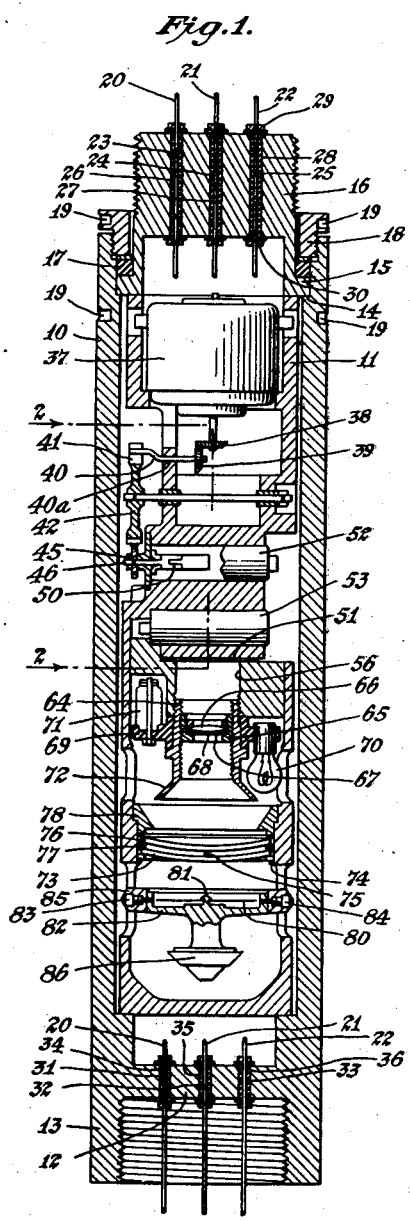
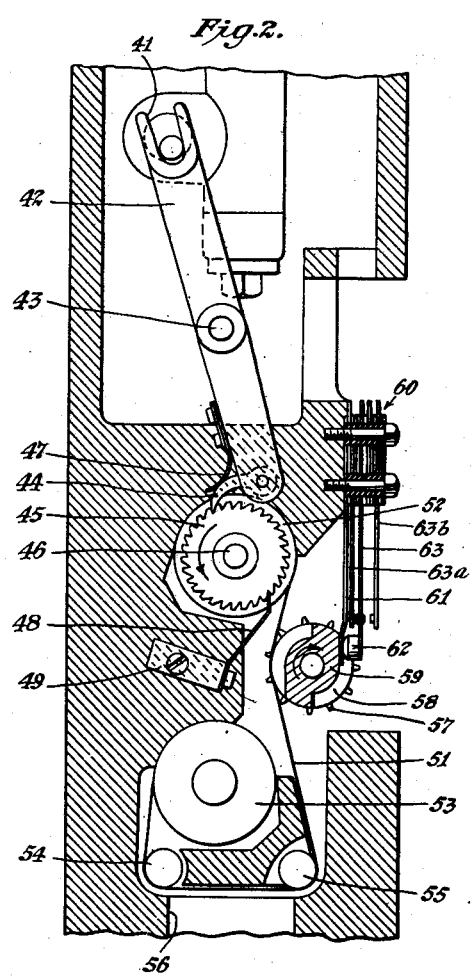
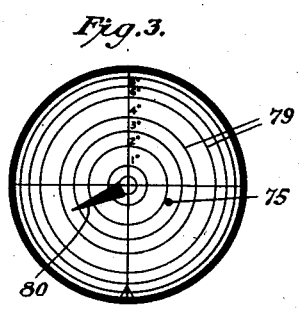
INVENTOR
*Henri Georges Doll*
BY
*Hoguet, Neary & Campbell*
ATTORNEYS Dec. 28, 1943.   HENRI-GEORGES DOLL   2,338,028
WELL SURVEYING INSTRUMENT
Filed Dec. 17, 1940    2 Sheets-Sheet 2
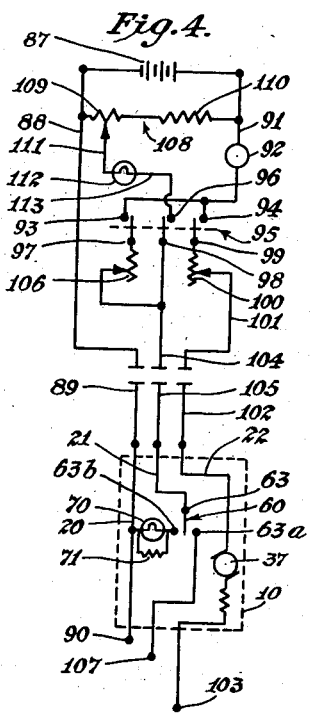
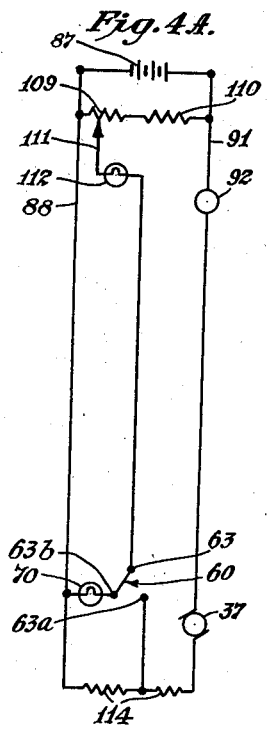
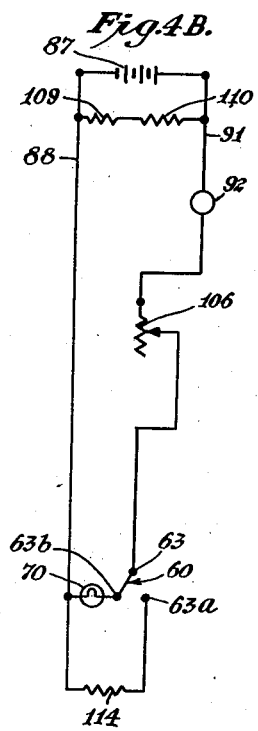
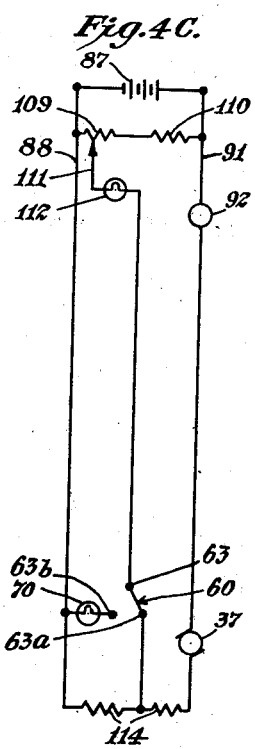
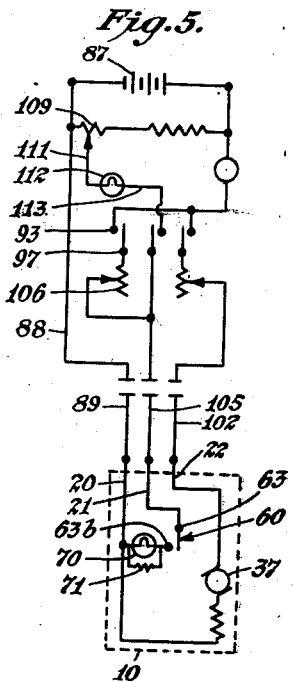
INVENTOR
*Henri Georges Doll*
BY
Hoguet, Neary & Campbell
ATTORNEYS Patented Dec. 28, 1943

2,338,028

UNITED STATES PATENT OFFICE 2,338,028

WELL SURVEYING INSTRUMENT

Henri-Georges Doll, Houston, Tex., assignor to Schlumberger Well Surveying Corporation, Houston, Tex., a corporation of Delaware Application December 17, 1940, Serial No. 370,466

7 Claims. (Cl. 33—205.5)

This invention relates to bore hole surveying, and more particularly to means for determining the inclination of a bore hole and the direction of such inclination at any desired point or points therein.

More specifically, the invention relates to well surveying apparatus in which a photographic record is obtained in the bore hole of means which provides a visual indication of the inclination and the direction of the inclination of the bore hole at different depths therein.

A high degree of accuracy and a minimum consumption of rig time are essential requirements in the modern servicing of deep oil wells. The drilling operations are normally suspended while such operations as surveying, electrical logging, side wall sampling, etc., are being conducted, and unnecessary time lost represents a considerable financial loss to the drilling company. Good accuracy in surveying is essential because acute problems involving property rights, structural positions, and sub-surface mapping are generally solved on the basis of surveys.

Heretofore, it has been the practice to make separate trips into the bore hole for each servicing operation to be effected. This was done in order to enable one type of apparatus to be removed from the cable and another type for carrying out a different operation to be substituted therefor. For this reason, two trips into the well were usually required in order to make an electrical log and a survey of the inclination of a well.

Moreover, some difficulty has been experienced in obtaining accurate results with prior well surveying apparatus. In certain types of apparatus, the well surveying unit is entirely self-contained in a water-tight housing and is automatic in operation, timing mechanism being used to effect this result. This arrangement has been found to be disadvantageous in that the sequence of readings cannot be controlled or varied once a run has been started, and there is no way of knowing whether the unit is operating properly or not without bringing it back to the surface.

Accordingly, it is an object of this invention to provide a very accurate surveying instrument which may be run into the hole with other apparatus such as, for example, an electrical logging device to enable both a survey and an electrical log to be obtained on a single trip into the bore hole, thereby greatly reducing the total lost rig time.

Another object of this invention is to provide an improved photographic surveying instrument which is completely controlled from the surface. Not only is the sequence of operations started from the surface, but also individual operations such as the movement of the film, the exposure of the film, the length of exposure, and making connections for additional instruments are each completely controlled from the surface.

A further object of this invention is to provide a positive indicator at the surface which continuously indicates which function the instrument is ready to perform, the indicator being controlled by the instrument in the bore hole.

Another object of this invention is to provide a multi-shot surveying instrument which does not require a timing mechanism either in the bore hole instrument or at the surface.

Still another object of this invention is to provide a multi-shot surveying instrument in which neither the time of the first recording nor the interval between recordings is predetermined, these times being varied according to the will of the operator.

A further object of this invention is to provide a multi-shot surveying instrument in which the spacing of the records on the film may be made equal and is not influenced by the thickness of the film nor the diameter of the roll of film.

Another object of this invention is to provide a surveying instrument which denotes the movement of the film to the observer, thereby indicating abnormal conditions such as sticking of the film, or running out of film.

Another object of the invention is to provide a means for marking the film to identify the depths of the various recordings.

Additional objects and features of the invention will become apparent from the following detailed description taken in connection with the accompanying drawings, in which:

Fig. 1 is a view in longitudinal section through a well surveying instrument constructed according to the present invention;

Fig. 2 is a partial view in vertical section, taken along line 2—2 of Fig. 1, looking in the direction of the arrows and illustrating more clearly the film control mechanism and the film operated switching means;

Fig. 3 is a typical record made by the instrument;

Fig. 4 is a schematic wiring diagram of the circuits employed in the apparatus shown in Figs. 1 and 2;

Figs. 4A, 4B and 4C are partial schematic diagrams of circuits illustrating the cycle of operations of the apparatus; and Fig. 5 is a simplified modification of the wiring diagram of Fig. 4.

The surveying instrument consists essentially of a watertight non-magnetic case strong enough to withstand the pressures to which it is subjected, a motor to drive the film, which in turn actuates cam operated switching means, a compass, a ball rolling on a surface of revolution, means for photographing the position of the compass and ball, and a suitable electric circuit.

The principle of the invention can best be understood by referring to the non-limiting example illustrated in the figures. Referring to Fig. 1, the well surveying instrument comprises a cylindrical casing 10, made of brass or other suitable material, within which is disposed a framework 11 on which the respective elements are mounted.

At the lower end of the casing 10 is provided a transverse closure member 12, below which is formed an internally threaded skirt portion 13 whereby the well surveying instrument may be threadedly secured to another assembly, if desired. The upper end of the casing 10 is open and it has a shouldered portion 14 adapted to seat a laterally extending flange 15 formed at the lower extremity of an externally threaded head piece 16, by means of which the instrument may be attached to an electric cable or other apparatus (not shown). In order to provide a watertight joint, a gasket 17 of rubber or other suitable material is placed over the flange 15 and a ring 18 is screwed down tightly over it into the internally threaded upper portion of the casing 10. The ring 18 and the casing 10 are provided with suitable recesses 19 for receiving spanner wrenches to assemble and disassemble the unit.

The circuit for controlling the well surveying instrument, which will be described in detail hereinafter, includes three conductors 20, 21 and 22 which pass through insulated bushings 23, 24 and 25, respectively, in corresponding bores 26, 27 and 28 formed in the head piece 16. The bushings 23, 24 and 25 are retained in position by the screws 29 and 30 which are threaded on the conductors 20, 21 and 22 as shown in the figure. For the sake of clearness, the electrical connections between the conductors 20, 21 and 22 and the apparatus have not been shown in Figs. 1 and 2.

At the lower extremity of the casing 10, the conductors 20, 21 and 22 pass through insulated bushings 31, 32 and 33 respectively, set in corresponding bores 34, 35 and 36, respectively, in the closure member 12, to the interior of the skirt portion 13, where they may be connected to other apparatus threadedly secured to the casing 10, if desired. When the well surveying instrument is used alone, conductors 20, 21 and 22 are connected together within the skirt portion 13 and a bullet nosed plug is screwed into the skirt portion 13. The plug is not essential, but it facilitates the lowering of the instrument into the bore hole.

Attached to the framework 11 is an electric motor 37, on the shaft of which is mounted a gear 38 which is adapted to drive a gear 39 secured to a crank arm 40 journaled in the bearing 40a in the framework 11. The crank arm 40 is adapted to be received snugly within a U-shaped slot 41 (Fig. 2) formed at the upper extremity of an arm 42 which is pivotally mounted intermediate its ends at a point 43 on the framework 11. It will be apparent that when the motor 37 is energized to rotate the crank arm 40, the arm 42 will oscillate periodically about the pivot point 43.

At the lower end of the arm 42 is fixed a pawl 44 which is adapted to engage a ratchet wheel 45 keyed on a rotatable shaft 46 journaled in the framework 11. The pawl 44 is maintained in yielding engagement with the ratchet wheel 45 by means of a spring 47 which is secured to the arm 42. A second spring 48 is secured to a block 49 mounted on the framework 11, which serves as a brake and permits the ratchet wheel 45 to turn in the direction of the arrow only. The shaft 46 on which the ratchet wheel 45 is mounted is provided with a longitudinally extending slot 50 (Fig. 1) within which the end of a strip of film 51 is adapted to be received. A conventional type film can 52 is mounted over the shaft 46 and it receives the exposed film and protects it while the record is being removed.

The strip of film 51 is drawn from a second conventional type film can 53 which is mounted in the framework 11 beneath the film can 52 and it passes over spaced apart horizontally disposed rollers 54 and 55 which are located adjacent the boundary of an aperture 56 through which the inclination indicating means to be described below may be viewed.

The film strip 51 is provided with conventional perforations along at least one edge thereof which perforations are adapted to be engaged by the teeth 57 on a sprocket wheel 58 which is rotatably mounted on the framework 11 intermediate the film cans 52 and 53. On the shaft of the sprocket 58 is mounted a cam 59 which is adapted to cooperate with a switch 60 also mounted on the framework 11. The switch 60 is provided with a movable spring arm 61 which is adapted to be actuated by the cam 59 to move an insulating member 62 formed on a spring contact arm 63, causing the contact arm 63 to make either of two contacts 63a or 63b depending upon the position of the cam 59.

The lower portion of the aperture 56 is internally threaded (Fig. 1) to receive an externally threaded tubular member 64. The interior wall of the tubular member 64 is threaded to receive an externally threaded ring 65 within which are mounted a lens 66 and a diaphragm 67 having a small aperture 68 formed therein. By turning the ring 65 either to the right or to the left as may be necessary, the lens 66 may be adjusted to focus the inclination indicating means which is described below on the portion of the film strip 51 disposed directly above the aperture 56.

Secured to the tubular member 64 is a radially extending flange 69 in which are mounted one or more electic lights 70 which provide the illumination necessary to light the inclination indicating means, when the photographic record is taken. If the lamps 70 are series connected then they should preferably be shunted by resistances 71 which may also be mounted on the flange 69. The lower portion of the tubular member 64 is formed with an outwardly extending conical portion 72 which is of such size and shape as to prevent any direct illumination from the lamps 70 from impinging upon the film strip 51 or the inclination indicating means disposed below.

The means for providing indications of the inclination of the bore hole comprises a curved member 73 made of glass or other suitable material which is seated on an inwardly extending ring 74 formed within the framework 11 and on which is disposed a freely rolling element 75, preferably a spherical steel ball. Mounted above the curved member 73 is a second curved member 76, also made of glass or other suitable material, which is spaced apart from the curved member 73 by a ring 77, made of brass, for example, such that the distance between the lower surface of the curved member 76 and the upper surface of the curved member 73 very slightly exceeds the diameter of the ball 75. The entire assembly is retained in position within the framework 11 by means of a ring 78.

The lower surface of the curved member 76 and the upper surface of the curved member 73 are ground in the shape of segments of ellipsoids of revolution, and the lower surface of the curved member 73 is provided with etched circular rings 79 (Fig. 3) which, when viewed from the aperture 68 in the diaphragm 67, indicate the deviation of the axis of the casing 10 from the vertical for various positions of the ball 75. Whenever the axis of the casing 10 deviates from the vertical axis, the ball 75 rolls to the lowermost position on the curved member 73 and provides an accurate indication of such angular deviation.

The direction of the inclination of the bore hole is afforded by means of a magnetic compass needle 80 which is pivotally mounted at the point 81 on a member 82 located beneath and coaxially with the curved member 73. The member 82 is mounted on pivots 83 and 84 in a gimbal ring 85 which is pivotally mounted on an axis at right angles to the axis of the pivots 83 and 84. A pendulum 86 is secured to the member 82 below the pivot 81 in such fashion that the compass needle 80 is maintained in a horizontal plane at all times. To assist in differentiating between the north and south ends of the compass needle 80 one end may be painted white and the other end black.

In Fig. 3 is shown a typical record of the inclination and the direction of the inclination made by the instrument. The position of the ball 75 with respect to the circular graduations 79 indicates accurately the angular deviation of the axis of the casing 10 from the vertical axis, and the position of the ball 75 with respect to the compass needle 80 indicates the direction of the inclination with respect to the magnetic north pole.

Fig. 4 is a schematic wiring diagram of a circuit employed when a cable containing three or more conductors is used to raise and lower the instrument in a bore hole and an electrical log and a well survey are to be made during the same trip into the bore hole. The portion above the break represents the surface equipment while that below the break represents the circuit of the apparatus lowered into the hole.

Referring to Fig. 4, the circuit includes a source of voltage 87 which may be, for example, a battery of about 250 volts, one terminal of which is connected through a conductor 88, a conductor 89 in the supporting cable and the conductor 20 to an electrode 90 which forms part of an electrical logging circuit in the bore hole. The other terminal of the source of voltage 87 is connected through a conductor 91 and a milliammeter 92 to the contacts 93 and 94 on a gang switch 95.

The gang switch 95 comprises the three contacts 93, 96 and 94 and three corresponding contact arms 97, 98 and 99. When the gang switch 95 is thrown to the left, the contact arm 97 engages the contact 93 and the contact arms 98 and 99, respectively, are moved out of engagement with the corresponding contacts 96 and 94. When the gang switch 95 is thrown to the right, the contact arm 97 is moved out of engagement with the contact 93 and the contact arms 98 and 99, respectively, engage the contacts 96 and 94, respectively. In the neutral position of the gang switch 95, the contact arms 97, 98 and 99 are all out of engagement with the respective contacts 93, 96 and 94.

The contact arm 99 is connected in series with a variable resistor 100 of about 1000 ohms, for example, a conductor 101, a conductor 102 in the supporting cable, the conductor 22 and the electric motor 37 to an electrode 103, which also forms a part of the electrical well logging circuit referred to above. The contact arm 98 of the gang switch 95 is connected through a conductor 104, a conductor 105 in the supporting cable and the conductor 21 to the contact arm 63 of the switch 60 which is adapted to be actuated by the cam 59 (Fig. 2) to engage either contact 63a or 63b as indicated above.

The contact arm 97 on the gang switch 95 is connected through a variable resistor 106 of about 300 ohms, for example, to the conductor 104. The contact 63a is connected to a third electrode 107 which forms part of the electrical well logging circuit and the contact 63b is connected through the lamps 70 to the conductor 20 in the casing 10.

Connected across the source of voltage 87 is a voltage divider circuit 108 which comprises variable resistor 109 connected in series with a fixed resistor 110. The resistor 109 may be of the order of 300 ohms while the resistor 110 is about 2000 ohms. The variable contact 111 of the variable resistor 109 is connected through a pilot light 112 and a conductor 113 to the contact 96 on the gang switch 95.

In order to make a well survey with the apparatus described above, the framework 11 is removed from the casing 10 before the apparatus is lowered into the bore hole and film with perforations along one or both edges such as, for example, 35 mm. moving picture film is placed in the film can 53. The film can 53 is then placed in the framework 11 and the leading end of the film strip 51 is pulled over the rollers 54 and 55, under the sprocket wheel 58 such that the teeth 57 enter the perforations thereof, and into the receiving film can 52 where it is inserted into the slot 50 formed in the shaft 46.

The shaft 46 is then given several turns to check the alignment of the film strip 51 and to ascertain if the mechanism is operating properly. The framework 11 and all the parts attached thereto are then inserted in the outer casing 10, the necessary electrical connections are made, the head piece 16 and the gasket 17 are placed into position and the ring 18 is tightly screwed down by means of a spanner wrench, providing an hermetical seal.

In the operations which are to be described below, it will be assumed that electrical well logging apparatus has been attached below the well surveying instrument by means of the lower internally threaded skirt portion 13 formed on the casing 10. The electrical connections to such electrical well logging operations are made in the usual manner through the conductors 20, 21 and 22, as shown in the circuit diagram of Fig. 4. An electric cable (not shown) is then attached in any conventional manner to the externally threaded head piece 16, electrical connections being made between the conductors 20, 21 and 22 and the corresponding conductors 89, 105 and 102 (Fig. 4) in the cable.

For the sake of accuracy a long, non-magnetic sinker with or without centering guides is rigidly attached above or below the well surveying instrument, but as this plays no part in the operation of the surveying instrument it is not shown in the drawings. The apparatus is then lowered to the desired depth in the borehole where it is stopped, or as is more customary, if possible, it is lowered below the desired depth and then pulled up slowly to the desired depth.

It will be assumed that at that instant the switch positions and circuit connections are as shown in Fig. 4. If it is now desired to obtain indications of the inclination of the well at that depth, the gang switch 95 is thrown to the right, engaging contact arms 98 and 99, respectively, with contacts 96 and 94, contact arm 97 remaining out of engagement with contact 93. This causes current to flow from the battery 87 through the conductor 91, the milliammeter 92, the contact 94 engaging contact arm 99 on the gang switch 95, the variable resistor 100, conductor 101, cable conductor 102 and conductor 22 to the motor 37, the circuit being completed through the electrode 103, the fluid in the bore hole, the electrode 90, the conductor 20, the cable conductor 89, and conductor 88.

The motor 37 now drives the gears 38 and 39, thereby rotating the crank arm 40 and causing the arm 42 to oscillate periodically and to drive the ratchet wheel 45 by means of the pawl 44. The rotation of the shaft 46 pulls film from the film container 53 and the displacement of the film strip 51 rotates the sprocket wheel 58 and the cam 59 mounted thereon in the direction indicated by the arrow.

As the cam 59 turns, the spring arm 61 acting through the insulating member 62 moves the contact arm 63 on the switch 60 into engagement with the contact 63b. This completes a circuit (Fig. 4) from the variable contact 111 on the variable resistor 109 through the pilot light 112, contact 96 engaging contact arm 98 on gang switch 95, conductor 104, cable conductor 105, conductor 21, contact arm 63 engaging contact 63b on switch 60, the lamps 70, the conductor 20, cable conductor 89, and conductor 88. This circuit is shown in simplified form in Fig. 4A, the resistance of the bore hole liquid between the electrodes 90, 107 and 103 being represented by the resistors 114. The voltage supplied by the voltage divider 108 is sufficient to cause the pilot light 112 to burn brightly but is not enough to cause the lamps 70 to light up because the current required to illuminate them greatly exceeds the current required to illuminate the pilot light 112.

As soon as the pilot 112 burns brightly, the gang switch 95 at the surface of the earth is moved to the neutral position in which all of the contact arms are out of engagement with their respective contacts. This opens the motor circuit, stopping further movement of both the motor 37 and the film strip 51. The entire assembly is allowed to remain stationary for a short while in order that the compass needle 80 and the spherical ball 75 may come to rest, and the gang switch 95 is then thrown to the left, moving contact arm 97 into engagement with the contact 93, the other two contact arms 98 and 99 remaining out of engagement with their respective contacts 96 and 94.

For this position of the gang switch 95, the full voltage of the battery 87 is supplied to a circuit including the conductor 91, milliammeter 92, contact 93 engaging contact arm 97 on gang switch 95, variable resistor 106, conductor 104, cable conductor 105, conductor 21, contact arm 63 engaging contact 63b on the switch 60, the lamps 70, the conductor 20, cable conductor 89 and conductor 88. This circuit appears in simplified form in Fig. 4B from which it will be seen that the full voltage of the battery 87 is applied to the lamps 70 through the resistor 106. The lamps 70 now burn brightly, indirectly illuminating the compass needle 80 and the spherical ball 75 on the curved member 73 and exposing the portion of the film strip 51 which lies adjacent the aperture 56.

After a suitable period of time, depending on the length of exposure desired, the gang switch 95 is restored to the neutral position and the recording of the orientation of the bore hole at that station is complete. The variable resistor 100 enables the current in the circuit of the motor 37 to be varied as desired and the variable resistor 106 controls the current in the circuit including the lights 70, as shown in Fig. 4B.

While the instrument is being moved to the next station or at any desired time, the operator at the surface of the earth next throws the gang switch 95 to the right, engaging contact arms 98 and 99, respectively, with the contacts 96 and 94, again energizing the motor 37, as indicated above, causing it to move the film strip 51. The displacement of the film strip 51 again rotates the cam 59 until the spring arm 61 on the switch 60 is released, causing the contact arm 63 to disengage the contact 63b and to engage the contact 63a.

In this position of the switch 60, voltage is supplied from the voltage divider circuit 108 to a circuit including the variable contact 111 on the variable resistor 109, the pilot light 112, contact 96 engaging contact arm 98 on the gang switch 95, conductor 104, cable conductor 105, the conductor 21, contact arm 63 engaging contact 63a on switch 60, the electrode 107, the liquid in the drill hole, the electrode 90, the conductor 20, the cable conductor 89 and the conductor 88. A simplified diagram of this circuit is shown in Fig. 4C, the resistance of the bore hole liquid between the electrodes 90, 107 and 103 being represented by the resistances 114.

Inasmuch as the resistance of the bore hole liquid between the electrodes 90 and 107 and the contact resistances of these electrodes are now included in the circuit of the pilot lamp 112, the latter burns rather dimly, thus providing an indication that the connections are as shown.

The motor 37 continues to rotate until the displacement of the film strip 51 causes the cam 59 to move the contact arm 63 on the switch 60 into engagement with the contact 63b, and the pilot light 112 burns brightly at the surface. From this point on, the sequence of operations, as described above, may be repeated to obtain a photographic record of the orientation of the bore hole at this second station.

If it is desired to make an electrical log after obtaining a photographic record of the orientation of the bore hole at the first station, the gang switch 95 should be moved into the neutral position while the pilot light is burning dimly. As indicated above and shown in Fig. 4C, the circuit at that instant is such that the contact arm 63 on the switch 60 is in engagement with the contact 63a so that the conductor 21 is connected to the electrode 107. Under these conditions, therefore, the cable conductors 89, 105 and 102 are connected to the electrodes 90, 107 and 103, respectively, and conventional electrical logging operations may be carried on by removing all of the apparatus above the break in Fig. 4 and substituting therefor conventional well logging apparatus of the type disclosed in the prior patents, Numbers 1,819,923 and 1,913,293.

As indicated above, if it is desired to use the well surveying instrument by itself in a well without auxiliary apparatus, the conductors 20, 21 and 22 (Fig. 1) should be connected together within the skirt portion 13 of the casing 10 and the skirt portion 13 closed off by a bullet nosed plug as described.

If it is desired to use the surveying instrument alone permanently, the circuit can be simplified in several respects. Since it may be convenient to use one set of surface equipment in conjunction with the surveying instrument as used either with or without auxiliary apparatus, the surface apparatus may be identical with that shown in Fig. 4. Instead of providing a plug and short circuiting the conductors 20, 21 and 22, the lower end of the casing 10 may be rounded and closed and the portion of conductor 21 which is connected to the contact 63a omitted. In such case a single pole, single throw switch may be used instead of the single pole, double throw switch 60 or, if preferred, the switch 60 can be employed, leaving the contact 63a disconnected. The electrical circuit of this modified form is shown in Fig. 5.

The manner of operation of this modification is identical with that of the modification shown in Fig. 4 except that the switch 60 has only two useful positions. In one position, the contact arm 63 is in engagement with the contact 63b and in the other it is out of engagement with this contact. Accordingly, the pilot light 112 will be either dark or illuminated depending upon which connection is made.

It will be apparent from the foregoing that the invention provides an improved well surveying instrument in which the spacing between successive records on the film can be maintained constant and independent of the amount of film in either film can. Moreover, inasmuch as the switch in the pilot light circuit is controlled by the displacement of the film strip, if the film breaks, jams or runs out, this is immediately indicated to the operator at the surface, and he can remove the instrument from the bore hole and correct the difficulty without wasting further time trying to take additional records.

In view of the fact that both the time between successive records and the length of the exposure of the film are controlled from the surface of the earth, a convenient means is afforded for identifying the depth of the record made at the various stations in the bore hole. For example, the depth of each station may readily be identified by determining the depth at which the first record is made and over-exposing the record made at each thousand foot interval thereafter. It has also been found very practical occasionally to leave an extra space between records, to establish definitely the depth of each record. To accomplish this, current is supplied to the motor 37 until two cycles of operation are completed instead of one.

Obviously, it is not necessary to make a complete well survey before proceeding to make an electrical log. It may be desirable in certain cases to make a few deviation records, then an electrical log, followed by more deviation records, etc. It is customary to make the deviation measurements when going down the bore hole and to make an electrical log on the way up, but this procedure can of course be varied at will. This advantageous feature is made possible by the fact that the operator is always aware of the exact position of the switch 60.

Many modifications in the specific embodiments described above will suggest themselves to those skilled in the art. For example, the pilot light 112 might be replaced by an ammeter and two separate sources of the potential might be used in place of the battery 87, one for the pilot light circuit and one for the motor and instrument lights. Alternating current might be used equally well.

While the invention has been described above in connection with a three conductor cable and a specific three electrode well logging circuit, other electrode configurations and circuits may be used with equal success, such as, for example, the apparatus disclosed in prior patents, Nos. 1,819,923 and 1,913,293. Other well servicing apparatus might also be used instead of a well logging circuit, as will be apparent to those skilled in the art.

The modifications described above are intended to be illustrative only, and the invention is not intended to be limited in any way thereby, but is susceptible of numerous changes in form and detail within the scope of the appended claims.

I claim:

1. A well surveying instrument for use with a multi-conductor cable comprising a casing adapted to be lowered into a bore hole, a plurality of conductors extending through the casing, means in the casing for providing indications of the inclination of the bore hole, means in the casing including a movable light sensitive record strip for obtaining a photographic record of said inclination indicating means, a motor in the casing and connected in series with one of said conductors for moving said record strip, a switch in the casing, having a contact member adapted to be actuated in accordance with the displacement of said record strip to engage either of two contacts selectively, said contact member and one of said contacts being connected in the circuit of another of said conductors, and electrical illuminating means in the casing connected to said other switch contact and to a third of said conductors.

2. Apparatus for obtaining indications of the inclination of a bore hole comprising a casing adapted to be lowered into a bore hole, means in the casing for providing indications of the inclination and the direction of the inclination of the bore hole, means in the casing including a light sensitive record strip for making a photographic record of said inclination indicating means, a motor in the casing for moving said record strip, electrical means in the casing for illuminating said inclination indicating means, a source of electrical energy at the surface of the earth, an electrical circuit connecting said source with said motor and illuminating means, switching means in said circuit for connecting said source selectively to said motor and illuminating means, a switch in the casing, actuated from said record strip after a predetermined displacement thereof has occurred, indicating means at the surface of the earth, and an electrical circuit connecting said switch and indicating means with said source of electrical energy, whereby the exposure and advancement of the record strip may be entirely controlled from the surface of the earth.

3. In apparatus for obtaining indications of the inclination of a bore hole through an electrical well logging circuit, the combination of a casing adapted to be lowered into a bore hole, means in the casing for providing indications of the inclination of the bore hole, a movable light sensitive record strip in the casing, three spaced apart electrodes disposed in the bore hole, a source of electrical energy at the surface of the earth, a pair of electrical conductors connecting said source to two of said electrodes, an electrical motor in the casing connected in series with one of said conductors for moving said record strip, a switch in the casing adapted to be actuated in response to the displacement of said record strip, said switch having a contact member adapted to engage a pair of contacts alternately, electrical illuminating means connected to said second conductor and to one of said switch contacts, an electrical connection between said other switch contact and said third electrode, voltage divider means connected to said source of electrical energy, a third electrical conductor connected to said switch contact member and to said voltage divider means, indicating means connected in the circuit of said third conductor, and switching means associated with said second and third conductors for controlling the connections between said source and the motor and illuminating means.

4. In a well surveying instrument comprising a casing adapted to be lowered into a bore hole, a light sensitive record strip in the casing, an electric motor for moving said record strip and illuminating means in the casing, the combination of a curved member mounted in the casing and having its upper surface formed as a segment of an ellipsoid of revolution, a freely rolling ball on said curved member, said curved member having indicia thereon indicating the angular deviation of the axis of the casing from the vertical for different positions of said ball, a compass needle universally mounted in the casing in cooperative relation with said curved member and ball, switching means in the casing adapted to be actuated by said record strip after a predetermined displacement thereof, indicating means at the surface of the earth for providing an indication that said predetermined displacement of the record strip has occurred, an electric circuit connected to said indicating means and switching means, a source of electrical energy at the surface of the earth, an electrical circuit connected to said source and to said motor and illuminating means in the casing, and switching means in said circuit at the surface of the earth for connecting said source selectively to said motor and switching means, whereby the exposure and the advancement of the record strip may be entirely controlled from the surface of the earth.

5. In apparatus for obtaining indications of the inclination of a bore hole, which apparatus includes a casing adapted to be lowered into a bore hole, means in the casing for providing indications of the inclination of the bore hole, a movable light-sensitive record strip, an electric motor in the casing for moving said record strip, and illuminating means in the casing for exposing said record strip, the combination of a source of electrical energy at the surface of the earth, electrical circuits connecting said motor and illuminating means with said source, switching means at the surface and connected in said circuits for connecting said source selectively to said motor and illuminating means, signalling means at the surface of the earth, and switching means in the casing for altering connections in a circuit to operate said signalling means, said last named switching means being actuated periodically by said record strip whenever a predetermined displacement thereof has occurred, whereby the advancement and exposure of the record strip may be entirely controlled from the surface of the earth.

6. In apparatus for obtaining indications of the inclination of a bore hole, which apparatus includes a casing adapted to be lowered into a bore hole, means in the casing for providing indications of the inclination of the bore hole, a movable light-sensitive record strip, an electric motor in the casing for moving said record strip, and illuminating means in the casing for exposing said record strip, the combination of a source of electrical energy at the surface of the earth, electrical circuits connecting said motor and illuminating means with said source, switching means at the surface and connected in said circuits for connecting said source selectively to said motor and illuminating means, signalling means at the surface of the earth, a signalling circuit extending from said casing to the signalling means, switching means in the casing for altering connections in said signalling circuit to operate said signalling means, and cam means driven by said record strip for actuating said last-named switching means whenever a predetermined displacement of the record strip has occurred, whereby the advancement and exposure of the record strip may be entirely controlled from the surface of the earth.

7. In apparatus for obtaining indications of the inclination of a bore hole, which apparatus includes a casing adapted to be lowered into a bore hole, means in the casing for providing indications of the inclination of the bore hole, a movable light-sensitive record strip, and an electric motor in the casing for moving said record strip, the combination of a source of electrical energy at the surface of the earth, first and second conductors connecting said source to the motor in the bore hole, switching means in the casing including a contact arm adapted to engage and disengage a contact intermittently, cam means driven by said record strip for actuating said switching means whenever a predetermined record strip displacement has occurred, electrical illuminating means connected to said contact and to said first conductor, a third conductor extending from the contact arm of said switching means to the surface of the earth, an indicating circuit connected to said first and third conductors at the surface of the earth, said indicating circuit including electrical indicating means and means for providing electrical energy, and a two-position switch at the surface of the earth having contacts in circuit with said second and third conductors for disconnecting said source of electrical energy and said indicating means from said second and third conductors, respectively, and for connecting said source of electrical energy to said third conductor, whereby the advancement and exposure of the record strip may be entirely controlled from the surface of the earth.

HENRI-GEORGES DOLL.